(12) United States Patent
Liao et al.

(10) Patent No.: US 10,251,067 B2
(45) Date of Patent: Apr. 2, 2019

(54) METHODS OF BEACON TRANSMISSION FOR MEASUREMENTS IN OPPORTUNISTIC SPECTRUM ACCESS

(71) Applicant: MEDIATEK INC., Hsinchu (TW)

(72) Inventors: Pei-Kai Liao, Nantou County (TW); Weidong Yang, San Diego, CA (US); Chien-Chang Li, Penghu County (TW); Bo-Si Chen, Keelung (TW)

(73) Assignee: HFI Innovation INC., Hsin-Chu (TW)

( * ) Notice: Subject to any disclaimer, the term of this patent is extended or adjusted under 35 U.S.C. 154(b) by 77 days.

(21) Appl. No.: 15/070,191

(22) Filed: Mar. 15, 2016

(65) Prior Publication Data

US 2016/0278125 A1 Sep. 22, 2016

Related U.S. Application Data

(60) Provisional application No. 62/133,742, filed on Mar. 16, 2015.

(51) Int. Cl.
*H04L 12/50* (2006.01)
*H04W 16/14* (2009.01)
(Continued)

(52) U.S. Cl.
CPC ........... *H04W 16/14* (2013.01); *H04W 24/00* (2013.01); *H04W 24/10* (2013.01); *H04W 48/00* (2013.01);
(Continued)

(58) Field of Classification Search
CPC .................................................... H04W 48/00
(Continued)

(56) References Cited

U.S. PATENT DOCUMENTS

2005/0064818 A1 3/2005 Assarsson et al. .......... 455/41.2
2008/0298589 A1 12/2008 Katar et al. .................... 380/258
(Continued)

FOREIGN PATENT DOCUMENTS

EP 2165487 A2 6/2007
EP 2996427 A1 5/2013
(Continued)

OTHER PUBLICATIONS

International Search Report and Written Opinion of International Search Authority for PCT/CN2016/076433 dated May 30, 2016 (10 pages).
(Continued)

*Primary Examiner* — Dang T Ton
(74) *Attorney, Agent, or Firm* — Imperium Patent Works; Zheng Jin

(57) ABSTRACT

Periodic Radio Resource Management (RRM) reporting from user equipments (UEs) is beneficial for a network to efficiently select a carrier with a cleaner channel to serve the UEs. To enable periodic RRM reporting from UEs, periodic beacon signal transmission for UE measurements is necessary. However, in a shared spectrum, precise periodic transmission cannot be guaranteed due to channel contention. A method of transmission with periodic time windows for beacon signal transmission is proposed to resolve potential issues. Under the proposed solution, beacon signal can be transmitted in a certain periodic fashion without frequent physical layer signaling. Furthermore, periodic beacon signal transmission for measurements can be kept with low transmission failure rate due to channel contention.

20 Claims, 4 Drawing Sheets

MEASUREMENT TIME WINDOWS

(51) Int. Cl.
*H04W 24/00* (2009.01)
*H04W 48/00* (2009.01)
*H04W 72/04* (2009.01)
*H04W 24/10* (2009.01)
*H04W 72/02* (2009.01)
*H04W 74/08* (2009.01)

(52) U.S. Cl.
CPC ............ *H04W 72/04* (2013.01); *H04W 72/02* (2013.01); *H04W 74/0808* (2013.01)

(58) Field of Classification Search
USPC .......................................................... 370/329
See application file for complete search history.

(56) References Cited

U.S. PATENT DOCUMENTS

| | | | |
|---|---|---|---|
| 2009/0103501 A1 | 4/2009 | Farrag et al. | 370/337 |
| 2013/0329658 A1 | 12/2013 | Liu | 370/329 |
| 2014/0036746 A1 | 2/2014 | Mannemala et al. | 370/311 |
| 2017/0164283 A1* | 6/2017 | Choi | H04W 52/0216 |

FOREIGN PATENT DOCUMENTS

| | | |
|---|---|---|
| WO | WO2008151261 A2 | 6/2007 |
| WO | WO2008151261 A3 | 6/2007 |
| WO | WO2014021888 A1 | 7/2012 |
| WO | WO2014182137 A1 | 5/2013 |

OTHER PUBLICATIONS

3GPP TSG RAN WG1 Meeting #80 R1-150627, Kyocera, The Necessity of LTE Beacon and LTE Header for LAA, Athens, Greece dated Feb. 9-13, 2015 (3 pages).
EPO, search report the EP patent application 16764241.2 dated Mar. 2, 2018 (9 pages).
3GPP TSG RAN Wg2 #77 R2-120790, Samsung, "Autonomous denial for Wi-Fi Beacon", Dresden, Germany, Feb. 6-10, 2012 (6 pages).
Fumihiro Inoue et al., "Novel Coexistence Scheme between Wireless Sensor Network and Wireless LAN for HEMS", IEEE SmartGridComm 2013 Symposium—Communication Networks for Smart grids and Smart Metering (Oct. 21, 2013).

* cited by examiner

MEASUREMENT TIME WINDOWS

BEACON TRANSMISSION AND UE BEHAVIOR

METHODS OF BEACON TRANSMISSION FOR MEASUREMENTS IN OPPORTUNISTIC SPECTRUM ACCESS

CROSS REFERENCE TO RELATED APPLICATIONS

This application claims priority under 35 U.S.C. § 119 from U.S. Provisional Application No. 62/133,742 entitled, "Methods of Beacon Transmission for Measurements in Opportunistic Spectrum Access" filed on Mar. 16, 2015; the subject matter of which is incorporated herein by reference.

TECHNICAL FIELD

The disclosed embodiments relate generally to wireless communication, and, more particularly, to beacon signal transmission for measurements in Licensed-Assisted-Access (LAA).

BACKGROUND

Third generation partnership project (3GPP) and Long Term Evolution (LTE) mobile telecommunication systems provide high data rate, lower latency and improved system performances. With the rapid development of "Internet of Things" (IOT) and other new user equipment (UE), the demand for supporting machine communications increases exponentially. To meet the demand of this exponential increase in communications, additional spectrum (i.e. radio frequency spectrum) is needed. The amount of licensed spectrum is limited. Therefore, communications providers need to look to unlicensed spectrum to meet the exponential increase in communication demand.

One suggested solution is to use a combination of licensed spectrum and unlicensed spectrum. This solution is referred to as "Licensed Assisted Access" or "LAA". In such a solution, an established communication protocol such as Long Term Evolution (LTE) can be used over the licensed spectrum to provide a first communication link, and LTE can be used over the unlicensed spectrum to provide a second communication link.

In LTE Release 13, LAA has been approved to enable LTE usage over unlicensed spectrum in 5 GHz for small cells. To facilitate efficient and fair spectrum sharing, a dynamic spectrum sharing mechanism called listen-before-talk (LBT) may need to be supported based on regulation rules in each country.

Due to the support of LBT, any physical signal or channel transmission has to be based on the channel contention results of LBT. As a result, the existing scheme of continual or periodic reference signal transmission (e.g., CRS, CSI-RS, and DRS) for UE RRM/CSI measurements is no longer feasible. For example, a discovery reference signal (DRS) transmission with a periodicity of 80 ms may suffer from long interruption (e.g., 160 ms) due to a failure of channel contention and thus result in insufficient information for radio resource measurement and scheduling.

SUMMARY

Periodic Radio Resource Management (RRM) reporting from user equipments (UEs) is beneficial for a network to efficiently select a carrier with a cleaner channel to serve the UEs. To enable periodic RRM reporting from UEs, periodic beacon signal transmission for UE measurements is necessary. However, in a shared spectrum, precise periodic transmission cannot be guaranteed due to channel contention. A method of transmission with periodic time windows for beacon signal transmission is proposed to resolve potential issues. Under the proposed solution, beacon signal can be transmitted in a certain periodic fashion without frequent physical layer signaling. Furthermore, periodic beacon signal transmission for measurements can be kept with low transmission failure rate due to channel contention.

In one embodiment, a method of allocating time windows for beacon signal transmission from base station perspective is proposed. A base station allocates a set of radio resources in a shared spectrum. The set of radio resources occupies a set of time windows periodically configured for downlink beacon signal transmission in a wireless communication network. The base station performs a channel access procedure during a time window and thereby obtaining a beacon signal start time if the base station detects a channel idle condition. The base station transmits a beacon signal to a plurality of UEs at the beacon signal start time. The time window length is longer than the beacon signal transmission length and shorter than a periodicity of the set of time windows.

In another embodiment, a method of performing measurements during allocated measurement time windows from user equipment perspective is proposed. A user equipment (UE) receives radio resource configuration in a wireless communication network. The radio resource configuration allocates a set of measurement windows for detecting beacon signals transmitted from a serving base station. The UE monitors a measurement window for beacon signal transmission. A beacon signal is detected from a beacon signal start time during the measurement window. A measurement window length is longer than a beacon signal transmission length and shorter than a periodicity of the set of measurement windows. The UE performs measurements based on the received beacon signal and transmits a measurement report to the serving base station.

Further details and embodiments and methods are described in the detailed description below. This summary does not purport to define the invention. The invention is defined by the claims.

BRIEF DESCRIPTION OF THE DRAWINGS

The accompanying drawings, where like numerals indicate like components, illustrate embodiments of the invention.

DETAILED DESCRIPTION

Reference will now be made in detail to some embodiments of the invention, examples of which are illustrated in the accompanying drawings.

Figure 1:
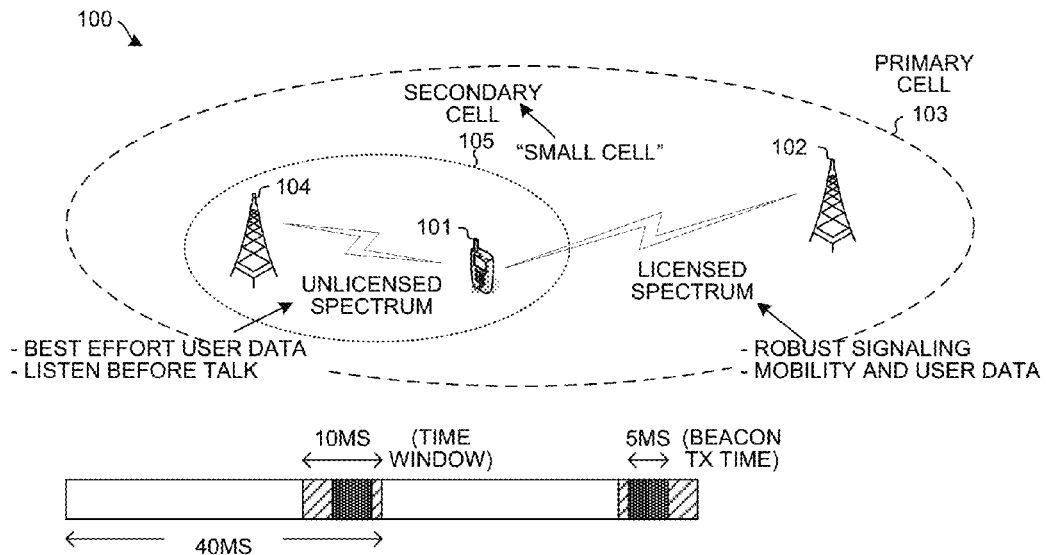
FIG. 1 illustrates an exemplary Licensed Assisted Access (LAA) wireless network in accordance with embodiments of the current invention.

FIG. 1 illustrates an exemplary Licensed Assisted Access (LAA) wireless system 100 with improved methods in accordance with embodiments of the current invention. Wireless communications system 100 includes one or more wireless communication networks, and each of the wireless communication networks has base infrastructure units, such as 102 and 104. The base units may also be referred to as an access point, an access terminal, a base station, eNB, or by other terminology used in the art. Each of the base stations 102 and 104 serves a geographic area. The geographic area served by wireless communications stations 102 and 104 overlaps in this example.

Base station 102 is a licensed base station that communicates with UE 101 via a licensed frequency band. In one example, base station 102 communicates with UE 101 via Long-Term Evolution (LTE) wireless communication. Base station 102 provides wireless communication to multiple UEs within primary cell 103. Base station 104 is an unlicensed base station that communicates with UE 101 via an unlicensed frequency band. In one example, base station 104 communicates with UE 101 via LTE wireless communication. Base station 104 can communicate with multiple UEs with a secondary cell 105. Secondary cell 105 is also referred to as a "small cell".

The exponential growth in data consumption has created large bandwidth demands that cannot be met by current wireless systems. To meet this ever-increasing demand for data, new wireless systems with greater available bandwidth are needed. Licensed Assisted Access (LAA) wireless networks can be used to provide greater available bandwidth. A LAA network utilizes licensed frequency bands in addition to unlicensed frequency bands contemporaneously, thereby provided additional available bandwidth to the UEs in the wireless system. For example, UE 101 can benefit from simultaneous use of the licensed frequency band and the unlicensed frequency band in a LAA network. The LAA network not only provides additional bandwidth for greater overall data communication, but also provide consistent data connectivity due to the presence of two separate data links. Having multiple data links available increases the probability that the UE will be able to achieve proper data communication with at least one base station at any given moment. While utilization of the unlicensed spectrum provides more available bandwidth, the use of the unlicensed spectrum faces practical problems that need to be addressed.

One problem is that many countries require operators in unlicensed frequency bands to adhere to the Listen-Before-Talk (LBT) protocol. The LBT protocol requires that diverse users of shared spectrum do not transmit signals over one another, and that all users have an equal and fair chance of accessing the unlicensed spectrum. Due to the requirement of LBT, any physical signal or channel transmission has to be based on the channel contention results of LBT. As a result, the existing scheme of continual or periodic reference signal transmission (e.g., cell-specific reference signal (CRS), channel state information reference signal (CSI-RS), and discovery reference signal (DRS)) for UE radio resource management and channel state information (RRM/CSI) measurements is no longer feasible. For example, a DRS transmission with a periodicity of 80 ms may suffer from long interruption (e.g., 160 ms) due to a failure of channel contention and thus result in insufficient information for radio resource management and scheduling.

In accordance with one novel aspect, a method of beacon signal transmission for UE measurement is proposed to facilitate efficient opportunistic spectrum access in a shared spectrum (either unlicensed or licensed frequency band) under the requirement of LBT. A beacon signal is potentially transmitted within a set of time windows. The time window is larger than the burst transmission time of the beacon signal. For example, a set of time windows is configured to exist every 40 ms and each time window length is 10 ms and the burst transmission time of the beacon signal is 5 ms. Within the time window, the beacon signal may be transmitted at any time location or may not be transmitted due to the channel contention in a dynamic spectrum sharing mechanism (e.g., LBT). Outside the time window, the beacon signal is allowed for transmission if the transmission starts within the time window. The set of time windows can be semi-statically configured by higher layer signaling or dynamically triggered by physical layer signaling.

Figure 2:
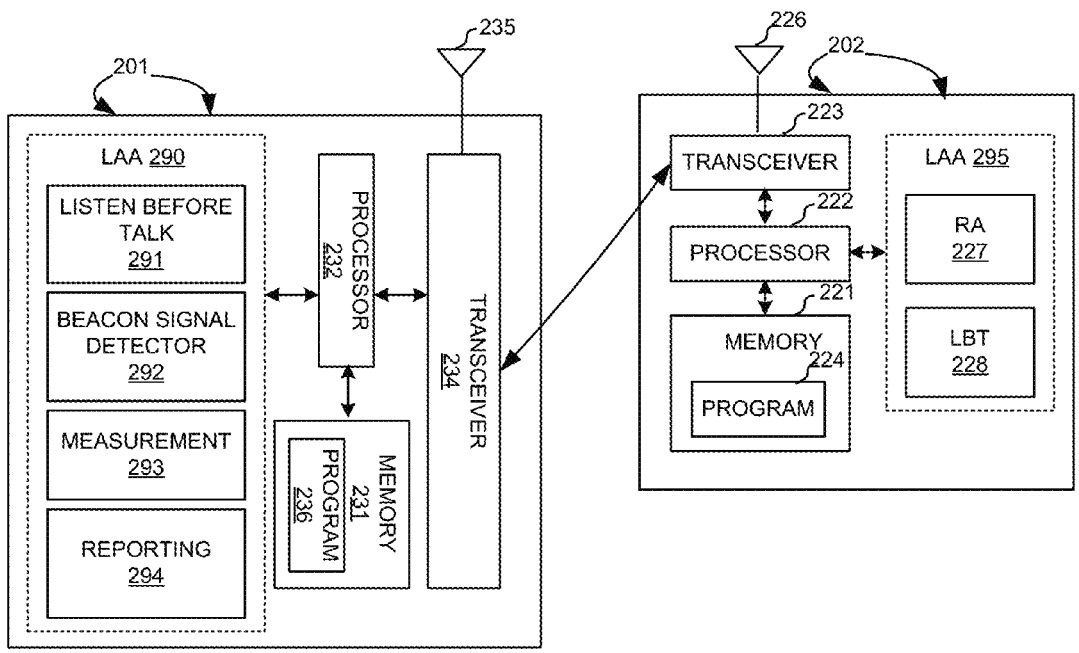
FIG. 2 illustrates an exemplary block diagram of a User Equipment (UE) and a base station (eNB) in accordance with embodiments of the current invention.

FIG. 2 illustrates the various components included in a UE 201 and a base station 202. Base station 202 may have an antenna array 226 with one or more antennas, which transmit and receive radio signals. An RF transceiver module 223, coupled with the antenna, receives RF signals from antenna array 226, converts them to baseband signals and sends them to processor 222. RF transceiver 223 also converts received baseband signals from processor 222, converts them to RF signals, and sends out to antenna array 226. Processor 222 processes the received baseband signals and invokes different functional modules to perform features in base station 202. Memory 221 stores program instructions and data 224 to control the operations of base station 202. Base station 202 also includes a set of control modules, LAA controller 225 that carries out functional tasks to configure, schedule, execute and communicate with the UE 201 for LAA tasks such as described in detail below. In one example, LAA controller 225 includes a resource allocator 227 that allocates radio resources of time windows for beacon transmission, and a LBT handler 228 that ensures BS 202 only transmits radio signals over the shared medium when the channel is idle or when it wins the channel contention.

User equipment UE 201 has an antenna array 235 with one or more antennas, which transmit and receive radio signals. An RF transceiver module 234, coupled with the antenna, receives RF signals from antenna array 235, converts them to baseband signals and sends them to processor 232. RF transceiver 234 also converts received baseband signals from processor 232, converts them to RF signals, and sends out to antenna 235. Processor 232 processes the received baseband signals and invokes different functional modules to perform features in UE 201. Memory 231 stores program instructions and data 236 to control the operations of UE 201.

UE 201 also includes a set of control modules and circuits that carry out functional tasks. The control modules and circuits can be implemented and configured by hardware, firmware, software, and a combination thereof. Listen-Before-Talk LBT handler 291 ensure that the UE 201 does not transmit signals when another unlicensed frequency band user is transmitting. Note LBT handler 291 may not be present if DL only transmission on the unlicensed spectrum is conducted. Beacon signal detector 292 monitors the configured time window and detects downlink beacon signal from its serving base station. Measurement circuit 293 performs radio signal measurements over the received beacon signal and reference signals. Measurement reporting circuit 294 reports the measurement results back to the serving base station.

Figure 3:
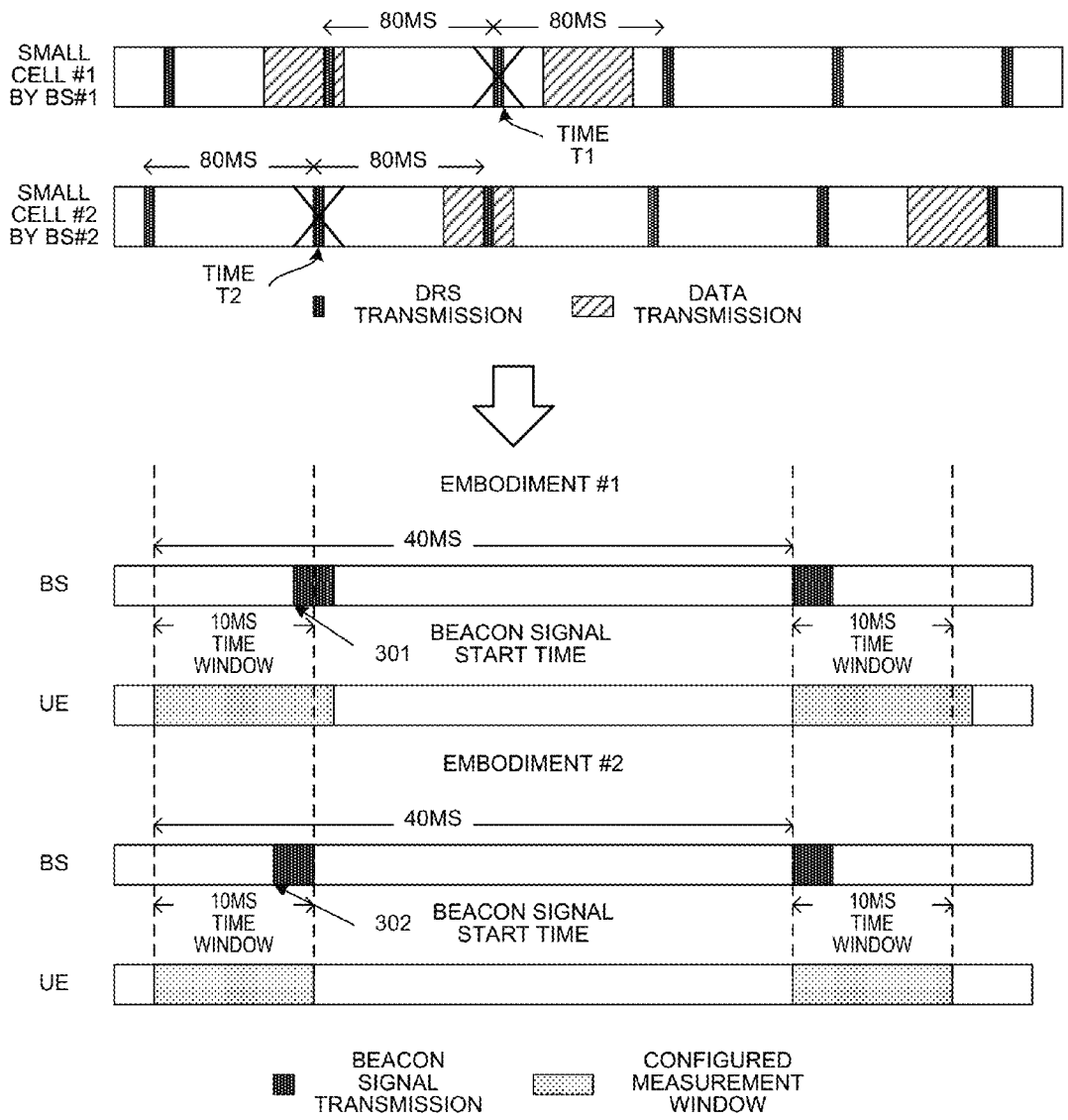
FIG. 3 illustrates an exemplary diagram of measurement time window allocation for downlink beacon signal transmission in accordance with embodiments of the current invention.

FIG. 3 illustrates an exemplary diagram of measurement time window allocation for downlink beacon signal transmission in accordance with embodiments of the current invention. In the example of FIG. 3, two small cells #1 and #2 are served by two base stations BS#1 and BS#2 as neighboring small cells, which may have overlapping cell coverage. For synchronization and measurement purpose, each small cell is configured to periodically transmit beacon signals including a discovery reference signal (DRS), e.g., with a periodicity of 80 ms. Due to the support of LBT, however, the DRS transmission may suffer longer interruption (e.g., 160 ms). This is because the BS is not allowed to transmit DRS if it fails to win the channel contention. For example, BS#2 is not allowed to transmit DRS at time T1 when there is ongoing data transmission in small cell #2. Similarly, BS#2 is not allowed to transmit DRS at time T2 when there is ongoing data transmission in small cell #1. As a result, DRS transmission suffers from long interruption and thus result in insufficient information for radio resource management and scheduling.

In accordance with one novel aspect, a method of beacon signal transmission for UE synchronization and measurement is proposed to facilitate efficient opportunistic spectrum access in a shared spectrum under the requirement of LBT. In general, in the consideration of beacon signal's design, a beacon signal transmission can support any or all of the following: the beacon signal facilitates Automatic Gain Control (AGC) setting and time/frequency synchronization for UE to maintain coarse values. The beacon signal supports RRM measurements to enable efficient carrier selection in the shared spectrum. The beacon signal occupies the channel continuously within the burst transmission in time domain and span over at least 80% of the nominal channel bandwidth in frequency domain. The beacon signal can support CSI measurements, including channel and interference measurements. Along with the beacon signal control information for broadcasting to either UEs or neighboring eNBs for efficient dynamic spectrum sharing can be carried.

As illustrated in FIG. 3, from eNB side, a downlink beacon signal is s potentially transmitted within a set of configured time windows based on the channel contention results of its LBT scheme. The time window is larger than the burst transmission time of the beacon signal. For example, a set of time windows is configured to exist periodically with a periodicity of every 40 ms, and each time window length is 10 ms, and the burst transmission time of the beacon signal is 2.5 ms. Within the time window, the beacon signal may be transmitted at any time location or may not be transmitted due to the channel contention in a dynamic spectrum sharing mechanism (e.g., LBT). Outside the time window, the beacon signal is allowed for transmission if the transmission starts within the time window.

In a first embodiment #1, the configured time window indicates a period where the transmission of the beacon signal can be started potentially. The eNB is allowed to start the transmission of the beacon signal within the time window as soon as it obtains the channel and completes the beacon transmission either inside or outside the time window. For embodiment #1, the configured measurement window for UE may be longer than the configured time window for beacon transmission. In a second embodiment #2, the configured time window indicates a period where the transmission of the beacon signal can be started and completed potentially. The eNB is allowed to start the transmission of the beacon signal within the time window as soon as it obtains the channel and should complete the beacon transmission inside the time window. For embodiment #2, the configured measurement window for UE may be the same as the configured time window for beacon transmission. For both cases, eNB is not allowed to start the transmission of the beacon signal outside the set of time windows. That is, the beacon signal start times 301 and 302 are located inside the time windows. The larger length the time window, the higher chance the beacon signal is transmitted successfully within the time window. In addition, based on the traffic load, the periodicity and the time length of the beacon signal transmission window can be changed.

The set of transmission time windows can be either periodic (semi-static configuration only) or periodic plus aperiodic (semi-static configuration together with dynamic triggering). The actual transmission time of the beacon signal can be transparent to UEs. However, the network should inform UEs when they can conduct measurements. If the set of transmission time windows are periodic, serving eNB can inform served UEs about the measurement window configuration by higher-layer signaling, e.g. RRC-layer signaling in 3GPP LTE system. If the set of transmission time windows are periodic plus aperiodic, serving eNB can inform served UEs about the measurement window configuration by higher-layer signaling, e.g. RRC-layer signaling in 3GPP LTE system, for the periodic part and by a broadcast physical-layer control signaling, e.g. DCI in common search space in 3GPP LTE system, for the aperiodic part. Furthermore, for the aperiodic part, the serving eNB informs served UEs a period of time the beacon signal transmission may be transmitted by physical-layer control signaling, e.g. a couple of subframes after the UEs receive the physical-layer signaling. Both semi-static configuration higher-layer signaling and dynamic triggering physical-layer signaling can be transmitted to the UEs on the same carrier as or a different carrier from the one where the beacon signal is transmitted. An eNB may semi-statically configure or dynamically trigger UE to monitor and measure over the beacon signal on multiple carriers for measurement reporting to enable efficient carrier selection.

The listen-before-talk mechanism for the downlink beacon signal transmission can be based on the scheme for frame-based-equipment (FBE). One example scheme for FBE is to have a minimum clear channel assessment (CCA) sensing period (e.g., >=25 us) at the end of each subframe. As soon as the channel is obtained, eNB transmits a burst of downlink beacon signal over integer subframes continuously. For example, the beacon signal start time in FIG. 3 occurs at a closest subframe boundary of a radio frame upon detecting the channel idle condition. The listen-before-talk mechanism for the downlink beacon signal transmission can be based on the scheme for load-based-equipment (LBE) as well. As soon as the channel is obtained, for example, eNB may transmit punctured downlink beacon signal within a fractional subframe for channel reservation first and then transmit a burst of downlink beacon signal over integer subframes continuously. In an alternative embodiment, the eNB may transmit other signal/channel within a fractional subframe for channel reservation first and then transmit a burst of downlink beacon signal over integer subframes continuously.

Figure 4:
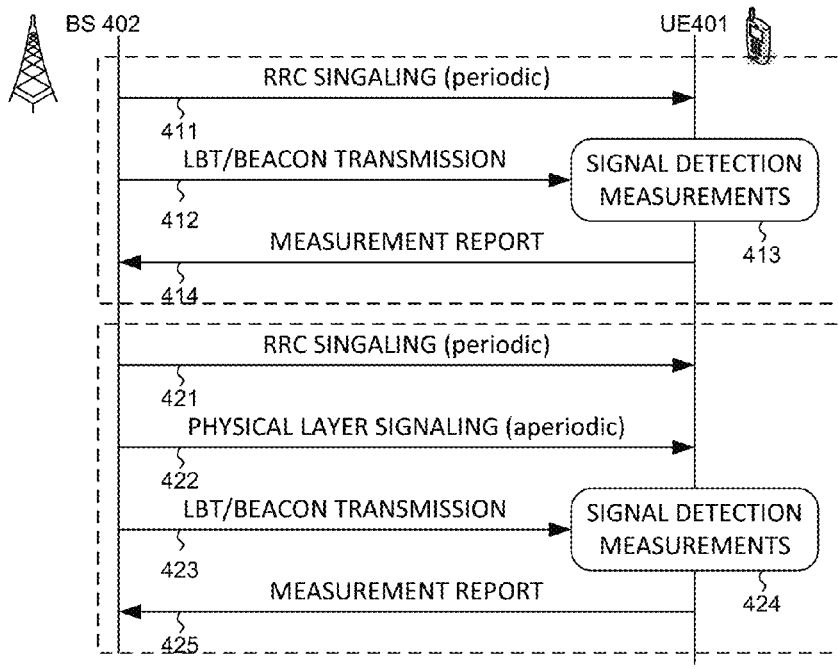
FIG. 4 illustrates an exemplary diagram of beacon transmission and UE behavior in accordance with embodiments of the current invention.

FIG. 4 illustrates an exemplary diagram of beacon transmission and UE behavior in accordance with embodiments of the current invention. For periodic beacon signal transmission scheme, UE 401 has the following behaviors. In step 411, UE 401 receives higher-layer signaling, e.g., RRC layer signaling in 3GPP LTE system, for configurations of periodic measurement window and measurement reporting. In step 412, UE 401 autonomously detects the integer-subframe transmission of the beacon signal within the semi-statically configured measurement windows if FBE LBT is applied in the network. Alternatively, UE 401 autonomously detects the fractional-subframe transmission of the reservation signal or the beacon signal and the integer-subframe transmission of the beacon signal within the semi-statically configured measurement windows if LBE LBT is applied in the network. In step 413, UE 401 conducts measurements on the bacon signal if beacon signal transmission is detected within the measurement windows. In step 414, UE 401 reports the measurement results based on the configured measurement reporting.

For periodic plus aperiodic beacon signal transmission scheme, UE 401 has the following behaviors. In step 421, UE 401 receives higher-layer signaling, e.g., RRC layer signaling in 3GPP LTE system, for configurations of periodic measurement window and measurement reporting. In step 422, UE 401 receives physical layer signaling, e.g., downlink control information (DCI) in 3GPP LTE system, for dynamic triggering of aperiodic measurement window and measurement reporting if UE 401 detects the physical layer signaling. In step 423, UE 401 autonomously detects the integer-subframe transmission of the beacon signal within the semi-statically configured and dynamically triggered measurement windows if FBE LBT is applied in the network. Alternatively, UE 401 autonomously detects the fractional-subframe transmission of the reservation signal or the beacon signal and the integer-subframe transmission of the beacon signal within the semi-statically configured and dynamically triggered measurement windows if LBE LBT is applied in the network. In step 424, UE 401 conducts measurements on the bacon signal if beacon signal transmission is detected within the measurement windows. In step 425, UE 401 reports the measurement results based on the semi-static configured periodic measurement reporting and dynamic triggered aperiodic measurement reporting.

The conducted measurements could be RRM, CSI or both. Both semi-static configuration higher-layer signaling and dynamic triggering physical-layer signaling can be received from a eNB on the same carrier as or a different carrier from the carrier where a UE monitor the beacon signal in the configured or triggered measurement windows. A UE may be semi-statically configured or dynamically triggered to monitor and measure over the beacon signal on multiple carriers for measurement reporting to enable efficient carrier selection.

Figure 5:
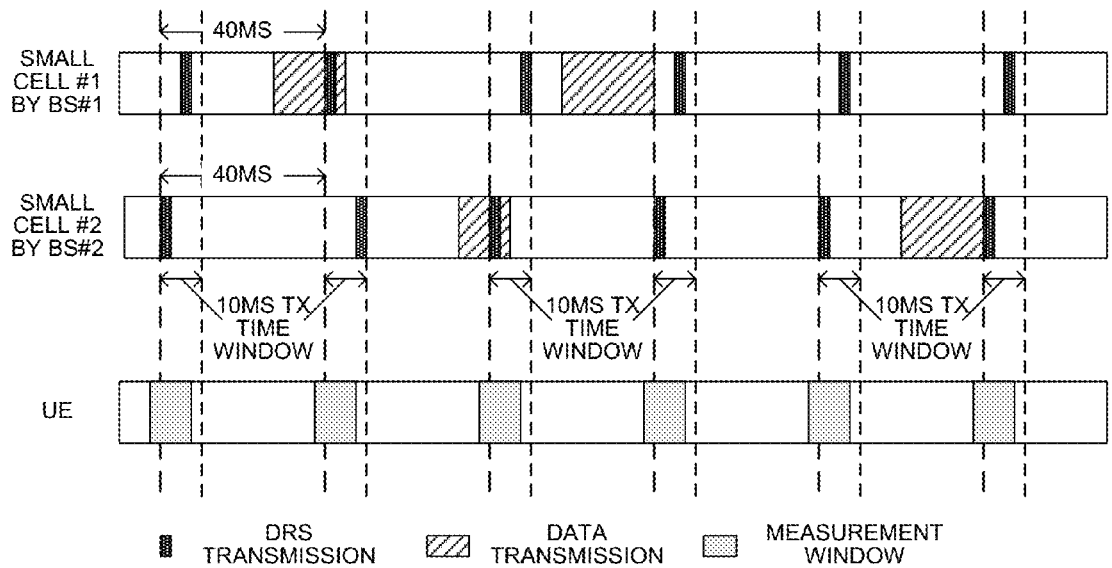
FIG. 5 illustrates an example when the measurement windows are not perfectly synchronized with the beacon signal transmission window due to imperfect synchronization between the serving eNB and the served UE.

FIG. 5 illustrates an example when the measurement windows are not perfectly synchronized with the beacon signal transmission window due to imperfect synchronization between the serving eNB and the served UE. In 3GPP system, from eNB side, it can be an implementation issue for beacon signal transmission and no specification change is needed. However, from UE side, it may require the following information for measurements depending on the cases shown in FIG. 5. First, time offset, time length and periodicity of the semi-statically configured UE measurement windows for beacon signal monitoring may be required. Second, a valid time length of dynamic triggering of the dynamically triggered UE measurement windows for beacon signal monitoring may be required. Such information may be provided to UE through higher-layer signaling.

Figure 6:
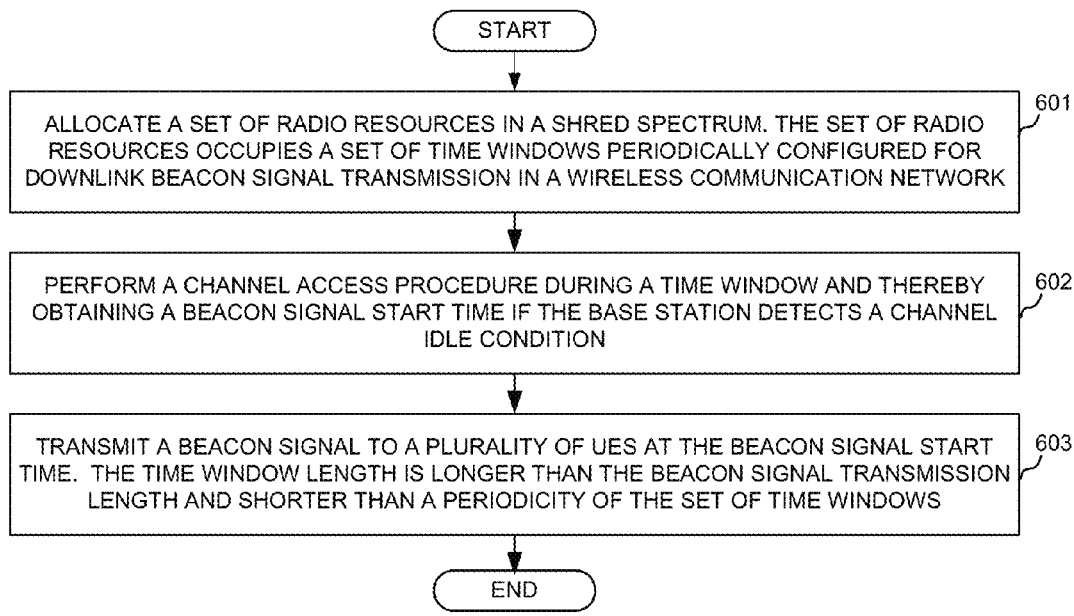
FIG. 6 is a flow chart of a method of allocating time windows for beacon signal transmission from base station perspective in accordance with embodiments of the current invention.

FIG. 6 is a flow chart of a method of allocating time windows for beacon signal transmission from base station perspective in accordance with embodiments of the current invention. In step 601, a base station allocates a set of radio resources in a shared spectrum. The set of radio resources occupies a set of time windows periodically configured for downlink beacon signal transmission in a wireless communication network. In step 602, the base station performs a channel access procedure during a time window and thereby obtaining a beacon signal start time if the base station detects a channel idle condition. In step 603, the base station transmits a beacon signal to a plurality of UEs at the beacon signal start time. The time window length is longer than the beacon signal transmission length and shorter than a periodicity of the set of time windows.

Figure 7:
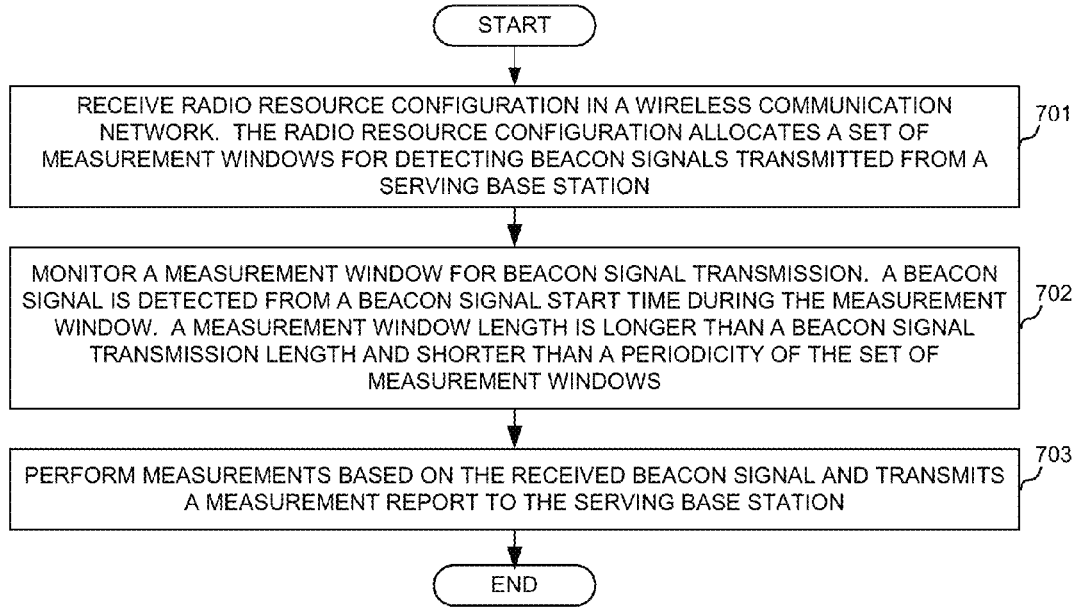
FIG. 7 is a flow chart of a method of performing measurements during allocated measurement time windows from user equipment perspective in accordance with embodiments of the current invention.

FIG. 7 is a flow chart of a method of performing measurements during allocated measurement time windows from user equipment perspective in accordance with embodiments of the current invention. In step 701, a user equipment (UE) receives radio resource configuration in a wireless communication network. The radio resource configuration allocates a set of measurement windows for detecting beacon signals transmitted from a serving base station. In step 702, the UE monitors a measurement window for beacon signal transmission. A beacon signal is detected from a beacon signal start time during the measurement window. A measurement window length is longer than a beacon signal transmission length and shorter than a periodicity of the set of measurement windows. Finally, in step 703, the UE performs measurements based on the received beacon signal and transmits a measurement report to the serving base station.

Although the present invention has been described in connection with certain specific embodiments for instructional purposes, the present invention is not limited thereto. Accordingly, various modifications, adaptations, and combinations of various features of the described embodiments can be practiced without departing from the scope of the invention as set forth in the claims.

What is claimed is:

1. A method, comprising:
    allocating a set of radio resources in a shared spectrum, wherein the set of radio resources occupies a set of time windows periodically configured for downlink beacon signal transmission by a base station in a wireless communication network;
    performing a channel access procedure during a time window and thereby obtaining a beacon signal start time inside the time window if the base station detects a channel idle condition; and
    transmitting a beacon signal using a radio frequency (RF) transceiver to a plurality of user equipments (UEs) at the beacon signal start time, wherein the time window length is longer than the beacon signal transmission length and shorter than a periodicity of the set of time windows.

2. The method of claim 1, wherein the beacon signal transmission is completed within the time window.

3. The method of claim 1, wherein the beacon signal transmission is completed outside the time window.

4. The method of claim 1, wherein the base station applies a listen-before-talk mechanism for the channel access procedure.

5. The method of claim 1, wherein the set of time windows is periodically configured, and wherein the base station sends the time window configuration to the UEs via radio resource control (RRC) layer signaling.

6. The method of claim 1, wherein an additional time window is aperiodically configured, and wherein the base station sends the additional time window configuration to the UEs via physical layer signaling.

7. The method of claim 1, wherein the occurrence and the length of the set of time windows are configured based on traffic load.

8. The method of claim 1, wherein the beacon signal start time occurs at a closest subframe boundary of a radio frame upon detecting the channel idle condition.

9. A method, comprising:
receiving radio resource configuration by a user equipment (UE) in a wireless communication network, wherein the radio resource configuration allocates a set of measurement windows for detecting beacon signals transmitted from a serving base station;
monitoring a measurement window for the beacon signal transmission, wherein a beacon signal is detected from a beacon signal start time during the measurement window, and wherein a measurement window length is longer than a beacon signal transmission length and shorter than a periodicity of the set of measurement windows; and
performing measurements based on the received beacon signal and transmitting a measurement report to the serving base station.

10. The method of claim 9, wherein the beacon signal transmission is completed within the measurement window.

11. The method of claim 9, wherein the beacon signal transmission is completed outside the measurement window.

12. The method of claim 9, wherein the set of measurement windows is periodically configured, and wherein the UE receives the measurement window configuration via radio resource control (RRC) layer signaling.

13. The method of claim 9, wherein an additional measurement window is aperiodically configured, and wherein the UE receives the additional measurement window configuration via physical layer signaling.

14. The method of claim 9, wherein the UE detects integer-subframe or fractional-subframe beacon signal transmission during the measurement window.

15. A user equipment (UE), comprising:
a receiver that receives radio resource configuration in a wireless communication network, wherein the radio resource configuration allocates a set of measurement windows for detecting downlink beacon signals transmitted from a serving base station;
a radio signal detector that monitors a measurement window, wherein a beacon signal is detected from a beacon signal start time during the measurement window, and wherein a measurement window length is longer than a beacon signal transmission length and shorter than a periodicity of the set of measurement windows; and
a measurement circuit that performs measurements based on the received beacon signal, wherein the UE transmits a measurement report to the serving base station.

16. The UE of claim 15, wherein the beacon signal transmission is completed within the measurement window.

17. The UE of claim 15, wherein the beacon signal transmission is completed outside the measurement window.

18. The UE of claim 15, wherein the set of measurement windows is periodically configured, and wherein the UE receives the measurement window configuration via radio resource control (RRC) layer signaling.

19. The UE of claim 15, wherein an additional measurement windows is aperiodically configured, and wherein the UE receives the additional measurement window configuration via physical layer signaling.

20. The UE of claim 15, wherein the UE detects integer-subframe or fractional-subframe beacon signal transmission during the measurement window.

\* \* \* \* \*